United States Patent [19]
Anderson et al.

[11] Patent Number: 6,137,801
[45] Date of Patent: Oct. 24, 2000

[54] TELECOMMUNICATION SWITCHING SYSTEM ADMINISTRATIVE AND MANAGEMENT TOOLS

[75] Inventors: David Sherman Anderson, Plymouth; Bradley M. Taber, III, Pocasset, both of Mass.

[73] Assignee: Excel Switching Corporation, Hyannis, Mass.

[21] Appl. No.: 09/072,858

[22] Filed: May 5, 1998

[51] Int. Cl.[7] .................................................. H04L 12/56
[52] U.S. Cl. .......................................... 370/400; 370/377
[58] Field of Search .................................... 370/384, 385, 370/373, 377, 352, 375, 400, 360, 367; 379/909, 279

[56] References Cited

U.S. PATENT DOCUMENTS

| | | | |
|---|---|---|---|
| 5,115,425 | 5/1992 | Ardon | 370/217 |
| 5,544,163 | 8/1996 | Madonna | 370/352 |
| 5,953,338 | 9/1999 | Ma et al. | 370/395 |

*Primary Examiner*—Douglas W. Olms
*Assistant Examiner*—Ken Vanderpuye
*Attorney, Agent, or Firm*—Cesari and McKenna, LLP

[57] ABSTRACT

The system separates the common administrative functions from the supervisory host applications. Each administrative function is performed by a separate administrative process that is dedicated to that function and is accessible by all the supervisory application. Thus when a supervisory process requires performance of an administrative function, it invokes operation of the corresponding administrative process. With this arrangement, only a single copy of each administrative process needs to be maintained. All communications between the administrative processes, the switching platform and/or the supervisory applications are routed through a gateway process. The gateway process then forwards the message to the appropriate process or switch and later returns the any reply results to the requesting process or application.

19 Claims, 8 Drawing Sheets

GATEWAY SERVER REGISTRATION TABLE

| SOFTWARE MODULE NAME | SOFTWARE MODULE ADDRESS | IPC ROUTE KEY |
|---|---|---|
| SWITCH CONTROLLER | MODULE ADDRESS FOR SWITCH CONTROLLER | 20, 40, 82, 12 |
| ⋮ | ⋮ | ⋮ |
| DOWNLOAD MANAGER | MODULE ADDRESS FOR DOWNLOAD MANAGER | 52, 20, 60, 75 |

API MESSAGE STRUCTURE

FIG. 5B ns system or supervisory application to send a message to another process and/or application, it queries the gateway server's registration table to determine which processes and/or applications accept the message. After obtaining the list of the receiving processes and/or applications, the sending process sends the message directly to the latter processes and/or application.

TELECOMMUNICATION SWITCHING SYSTEM ADMINISTRATIVE AND MANAGEMENT TOOLS

TECHNICAL FIELD

This invention relates to telecommunications switching systems and specifically to software applications that administer and manage a switching system in which a plurality of switching nodes are interconnected by an internodal network.

BACKGROUND OF THE INVENTION

An example of a switching system to which the present invention applies is described in U.S. Pat. No. 5,544,163, Expandable Telecommunications System, the contents of which are incorporated herein by reference. The system comprises a plurality of programmable switching nodes and a host that exercises supervisory control over the switching nodes. The host is a group of software applications that typically reside on a computer to provide various supervisory and call control functions. The switching nodes are interconnected by an internodal switching network. A second network termed the "host network," interconnects the switching nodes and the host computer for supervisory control. Examples of the host supervisory applications include call control applications that control call switching functions in the switching nodes, call setup and teardown applications that perform call setup and teardown functions, billing applications that allocate costs to consumers who use the system, applications that incorporate ancillary services such as call forwarding and call waiting, and testing applications that test the performance of the switching nodes.

For the host to control the switching nodes, each host supervisory application must perform certain common administrative functions. These functions include access to switch configurations, switch monitoring, and switch diagnosis. The software for performing these common functions is duplicated in each of the supervisory applications. Accordingly, in order to maintain and upgrade these common administrative functions, all host supervisory applications must be correctly modified. Software errors may well result when changing the common functions by, among other things, failing to make the necessary changes in all the supervisory applications.

Moreover, as the number of supervisory applications increases so too does the time it takes to modify them. Thus, the system operator may then have to bring the system down in order to correctly change the administrative functions without causing errors in switching operations.

SUMMARY OF THE INVENTION

We have separated the common administrative functions from the call-control and the other supervisory functions typical of the host applications. Each administrative function is performed by a separate administrative process (program) that is dedicated to that function and is accessible by all the supervisory applications. Thus when a supervisory application requires performance of an administrative function, it invokes operation of the corresponding administrative process. With this arrangement, common administrative functions are centralized for design and maintenance and only a single copy of each administrative process needs to be maintained. This provides an environment in which the administrative processes require less time to maintain and upgrade and it also eliminates the errors associated with duplication of the administrative function.

Specifically, in the preferred embodiment of the invention, the common administrative processes communicate with the supervisory applications and with each other by obtaining routing information from a gateway server, which is one of the administrative processes. After the system starts up, each administrative process and each supervisory application registers with the gateway server and indicates the types of messages it handles. Messages in the system include requests and commands from the supervisory applications to the administrative processes or the switching nodes in a switching platform and also information generated by administrative processes that is broadcast to other administrative processes and/or supervisory applications. The gateway server maintains a registration table linking each type of message with the processes or applications that accept them. In order for an administrative process or supervisory application to send a message to another process and/or application, it queries the gateway server's registration table to determine which processes and/or applications accept the message. After obtaining the list of the receiving processes and/or applications, the sending process sends the message directly to the latter processes and/or application.

In addition to the gateway server, the administrative processes on the system may include, inter alia, a system controller, a graphical user interface(GUI), a configuration manager, a switch controller, an event manager, an interface layer and a communications manager. The communications manager is a software switch; it connects the administrative processes and supervisory applications to the switching nodes. The switch controller maintains a model of the switching platform and it manages each physical or logical entity in the platform. Each administrative process includes a gateway agent which provides communication with the gateway server and which routes the messages from the administrative process to receiving processes and/or applications. Similarly, each supervisory application has a corresponding interface module which provides communication with the administrative processes and which routes messages form the supervisory application to the administrative processes.

When the system is powered on, the system controller is the first process to start. It initiates the other administrative processes and maintains a record of the status of each of these processes in order to restart it if it fails. The supervisory applications are then started. Upon starting up, each administrative process and supervisory application registers with the gateway server and informs the gateway server of the messages it process. As each message is generated by the administrative process or supervisory application, the associated process or application checks with the gateway server's registration table to determine which administrative processes and/or supervisory applications are registered for that type of message. Based on the registration information from the gateway server, the gateway agent in the producing process or the associated interface module for the producing application then routes the message to the appropriate processes, and/or applications.

During a switching node reconfiguration, the configuration manager receives the reconfiguration information from the GUI and stores this information in a configuration database. The configuration manager then signals the switch controller of changes to the switch configuration. The switch controller, in turn, executes the reconfiguration of the affected switching node. After executing the reconfiguration, the switch controller transmits an appropriate response message to the GUI and the switch controller forwards the response message to the event manager.

The event manager maintains a record of various events, status, and other information from system processes. It also logs hardware and software error messages from the switching platform. The event manager is programmable to allow the system administrator to customize the reporting of alarms to the system operator through external equipment such as phones, pagers and electronic mail. The system operator and processes may also obtain status information about the switching nodes and other processes from the event manager.

BRIEF DESCRIPTION OF THE DRAWINGS

The invention description below refers to the accompanying drawings, of which:

FIG. 3-A illustrates the registration table in the gateway server;

FIG. 3-B is an example of the APIs used by the administrative processes during communication with other processes or applications;

DETAILED DESCRIPTION OF AN ILLUSTRATIVE EMBODIMENT

Figure 1:
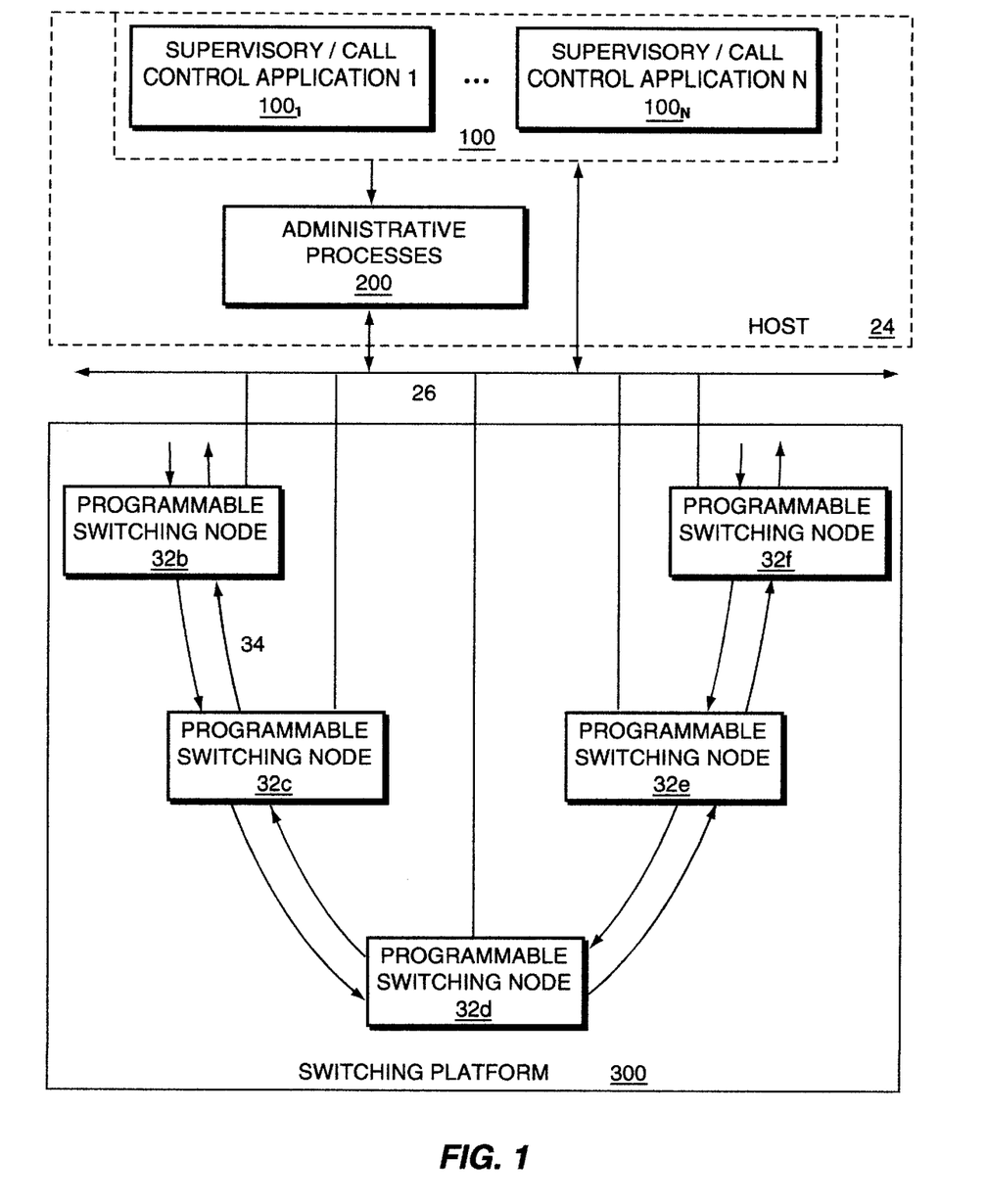
FIG. 1 is a diagram of a call switching system incorporating the invention.

FIG. 1 is a schematic diagram of a communications network that is configured to process calls to, from and within a switching platform 300 in accordance with the present invention. The switching platform 300 includes switching nodes 32$b$–32$f$ that are connected by a ring-like internodal switching network 34 to pass among them the various messages handled by the switching platform 300. Each switching node is associated with a plurality of network/line interfaces (not shown) which provide connections between the switching system and subscribers' lines, for example, and also with other switching systems such as the PSTN. The communications network also includes host computer software 24 that runs host supervisory and call control applications 100$_1$–100$_N$ and also administrative processes 200 that perform common administrative functions. The supervisory applications 100$_1$–100$_N$ provide overall supervision, i.e. control and monitoring, of the switching functions of the network. The call control functions perform such supervisory functions as call setup and teardown on calls processed by the switching nodes 32$b$–32$f$. The host 24 is linked to the switching nodes 32$b$–32$f$ by a host network 26. The administrative processes 200 are a group of independent software subsystems, each of which performs a specific administrative task.

Figure 2A:
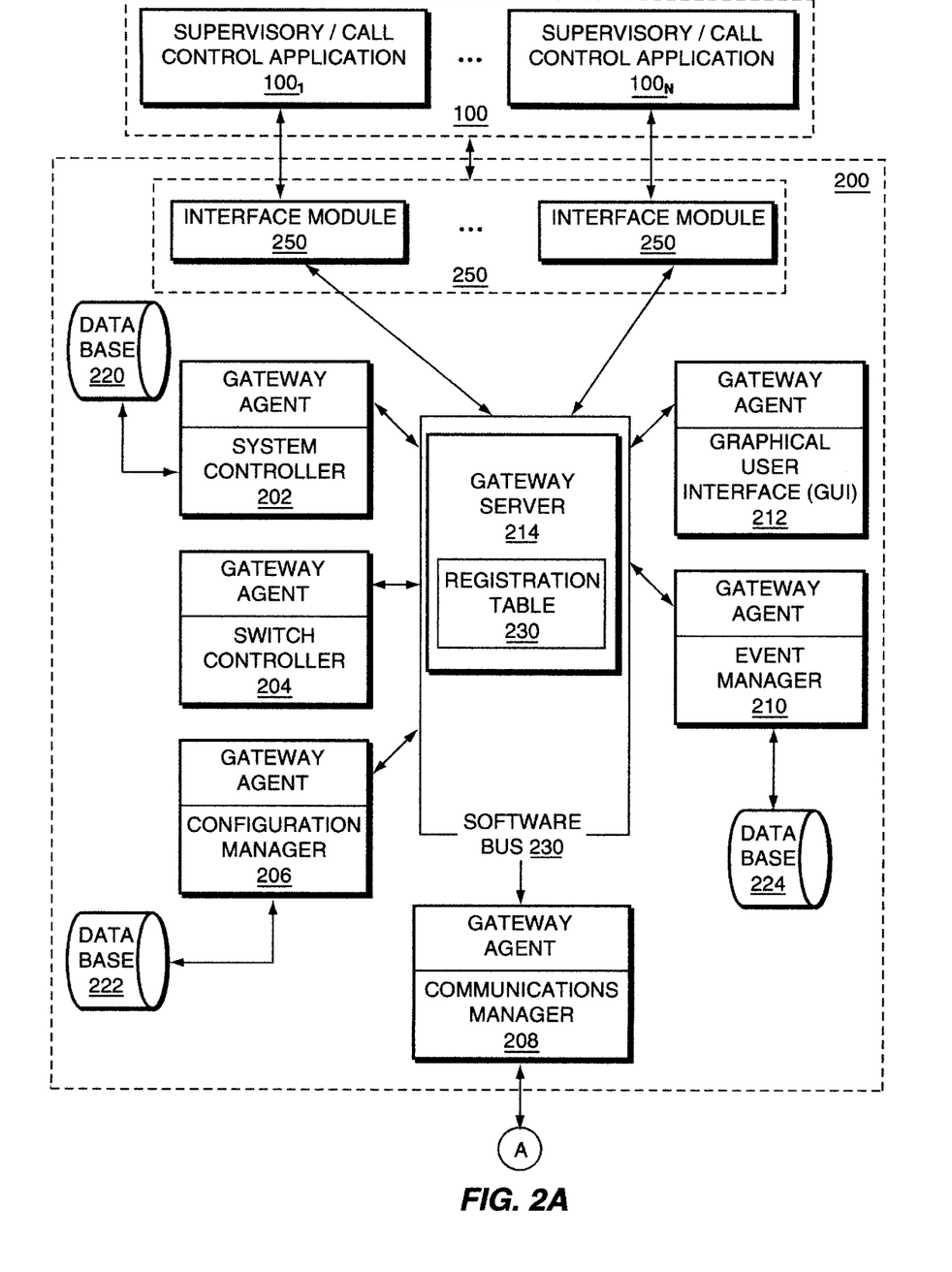
FIG. 2 is a schematic diagram of the administrative processes and how they interact with each other and with the host supervisory applications and the switching platform.
Figure 2B:
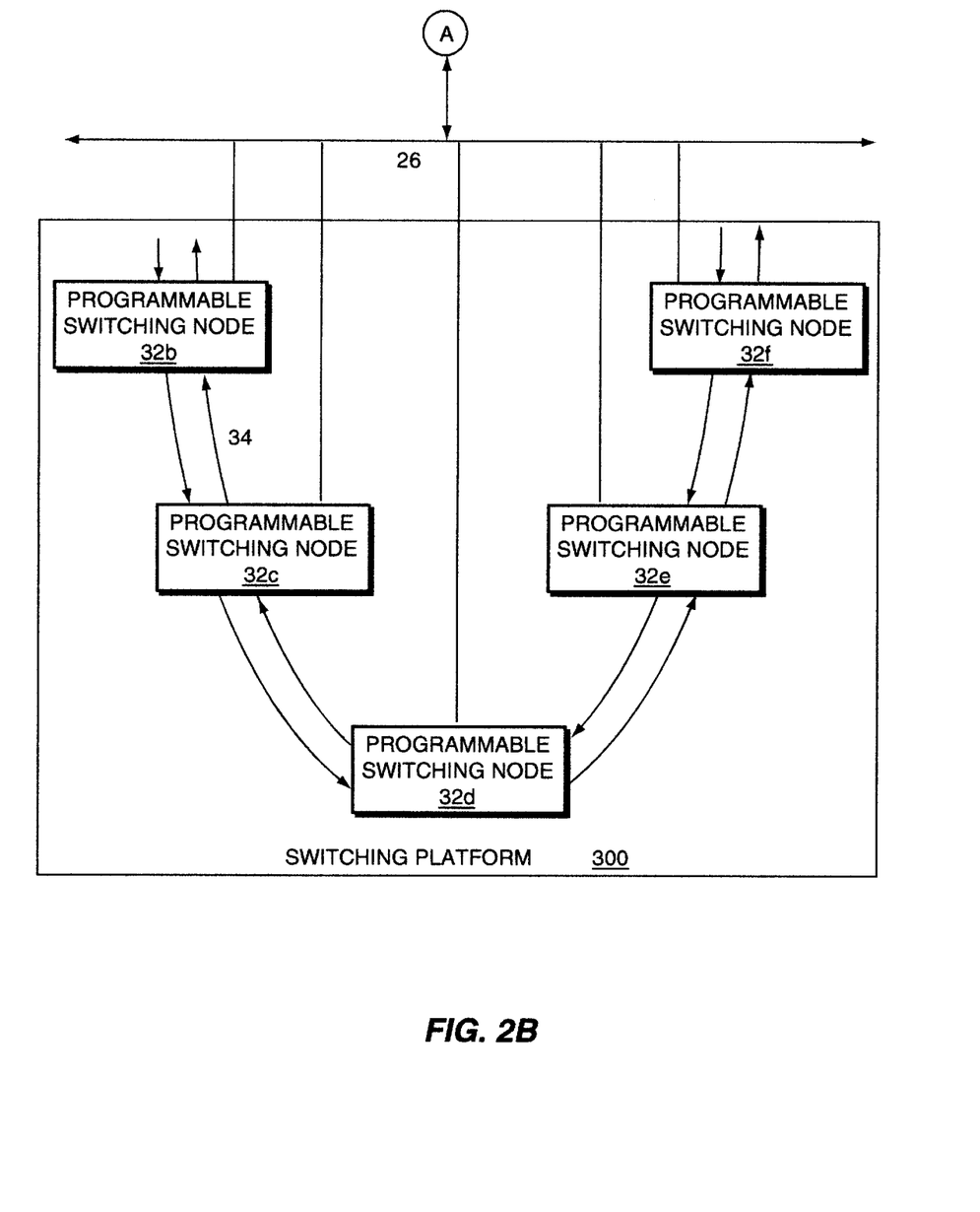

The illustrative administrative processes 200 shown in FIG. 2 include a system controller 202, a switch controller 204, a configuration manager 206, a communications manager 208, an event manager 210, a graphical user interface (GUI) 212, and a gateway server 214. Each administrative process, except the gateway server, includes a gateway agent for communications between the administrative process and the gateway server 214. The gateway agent enables the administrative processes to determine which processes and/ or applications accept the messages they produce. In addition to the administrative processes, the system also includes an interface layer 250 which comprises interface modules 250$_1$–250$_N$. Each supervisory application has a corresponding interface module that provides access to the administrative processes 200 and switching platform 300.

The system controller 202 initiates operation of the other administrative processes upon system startup. The GUI 212 is the interface between the system administrator and the other administrative processes and the switching nodes. It displays status information, current switch configuration and alarms from the other administrative processes 20. It is also used by the system operator for input operations.

The configuration manager 206 stores switch configuration information in a configuration database 220. The switch controller 204 manages downloading and configuration of the switching nodes 32$b$–32$f$. It also performs required redundancy management of components in the system. It maintains a model of the switching platform and creates independent software sub-components to manage each physical or logical entity in the switching platform. The sub-components communicate with each other in order to request activity or to indicate that an activity has been completed. As new hardware is added to the switching platform, the switch controller creates additional sub-components to manage the additional hardware.

The event manager 210 maintains a record of messages and alarms from the other processes in an event database 222. The communications manager is a software switch that connects the switching platform 300 with the administrative processes 200 and supervisory applications 100. The gateway server 214 is software module used to establish communications between the administrative processes and the supervisory applications. The gateway server maintains a table of the types of messages that each process and application accept.

On a system with a single host computer, the administrative processes 200, supervisory applications 100, and switching nodes 32$b$–32$e$ communicate with each other through Application Programming Interface (API) messages. API messages are software messages that processes or applications use to communicate with each other and with the lower level operating system. On a system with multiple host computers, the administrative processes 200, supervisory applications 100, and switching nodes 32$b$–32$e$ may communicate with each other with a multiple-processor protocol, such as, TCP/IP.

Alarms from the switching nodes 30 and the administrative processes 20 are programmable by the system administrator. The system controller 202 may use the programmed instructions from the system administrator to respond to alarms from other administrative processes and to determine if there is an administrative process 20 failure. The system controller 202 also collects status information from the administrative processes 20 and forwards them to the event manager 210. The event manager 210 maintains a record of events, status, and other information from other administrative processes 200, supervisory applications 100 and switching nodes 32$b$–32$f$. It also maintains a record of hardware and software errors from the switching platform 300. System operators or other administrative processes 200 may obtain status information about other administrative processes or switching nodes 32$b$–32$f$ from the event manager 210. The event manager may also be programmed to allow the system administrator to customize alarm report to a system operator through external equipment such as phones, pages and e-mails.

Figure 3A:
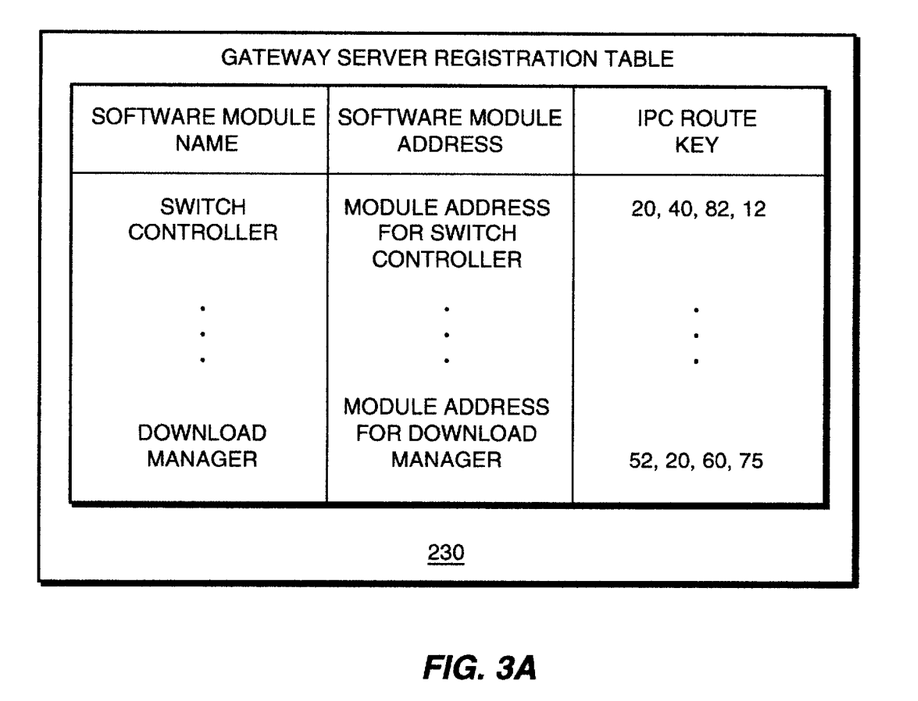

When the system is powered on, the system controller 202 is the first process to start. It initiates the other administrative processes 200 and maintains records of the status of each administrative process in order to restart it if it fails. Thereafter, the supervisory applications are each started. Upon starting up, the administrative processes 200 and supervisory applications 100 register with the gateway server 214 by sending registration messages. Each registration message informs the gateway 214 of the tasks and APIs handled by the registering process 200 or application 100. The gateway server maintains a registration table 230 (FIGS. 2 and 3-A) that includes a list of software module names and software module addresses of the registering processes and applications and IPC Route Keys that are ID tags for the system messages that the registering process handles.

Figure 3B:
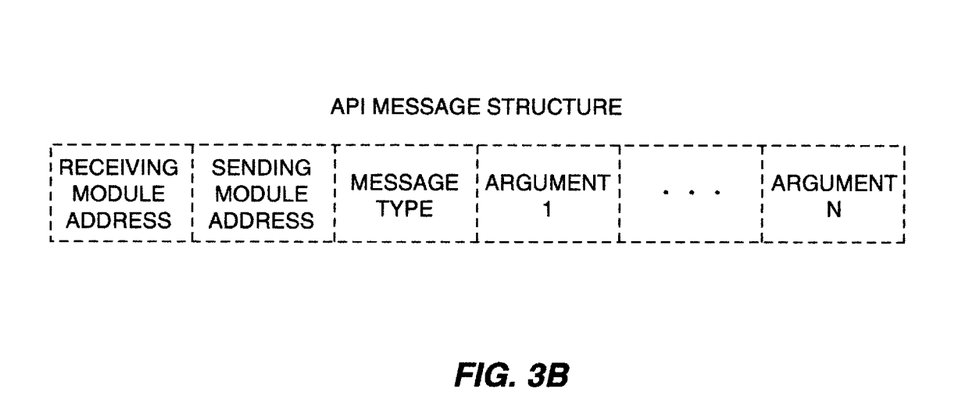

When invoking the operation of another process, each process 200 or application 100 transmits an API. The API, shown in FIG. 3B, includes the address of the sending process, the address of the receiving process and the message type sent to the receiving process along with the associated arguments for that message. The gateway agent in the sending process obtains the receiving process name and address from the server's registration table and it routes the message and arguments to the receiving process.

During a switch reconfiguration, the configuration manager 206 receives configuration information from the GUI 212 and stores that information in a configuration database 222. The configuration manager 206 then signals the switch controller 204 of any changes to the switch configuration. The switch controller 204 executes the configuration information on the affected switching nodes 32b–32f in the switching platform 300. The switch controller 204 communicates with the switching platform 300 through the communications manager 208. After executing the configuration with the switching platform 300, the switch controller 204 generates an appropriate response to the switch configuration. The response message is displayed to the system administrator through the GUI 212 and the response message is also forwarded to the event manager 210. In addition to switch configuration, the switch controller 204 manages the addition or removal of hardware in switching nodes 32b–32f.

Figure 4A:
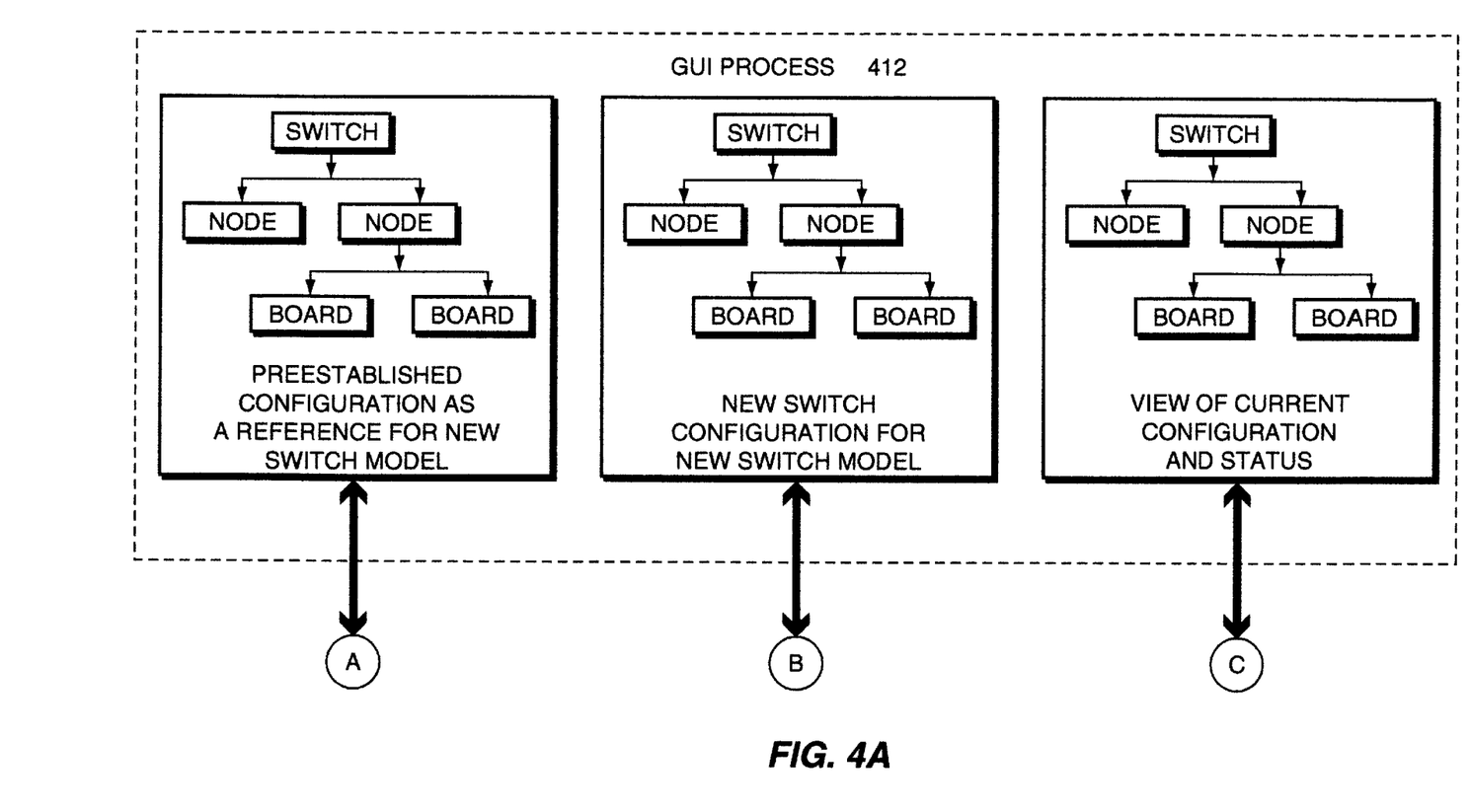
FIG. 4 illustrates the switch reconfiguration process.
Figure 4B:
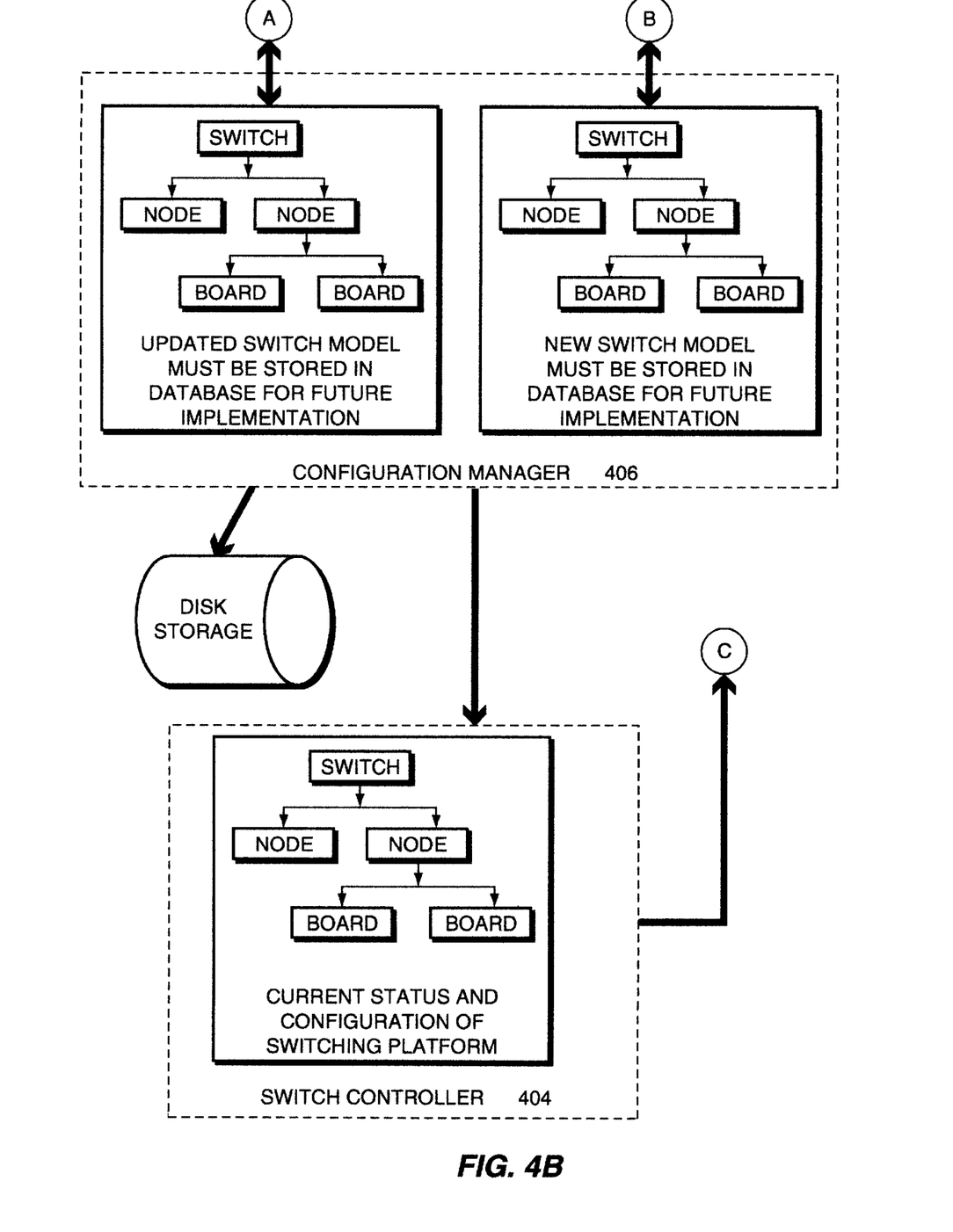

FIG. 4 is a diagram that shows the interaction between the GUI process 412, the switch controller 404, and the configuration manager 406 during a switching node reconfiguration. The system administrator may create a new switch configuration model from a pre-existing switch configuration. The new switch configuration model is sent to the configuration manager 406 and stored in the configuration database 420 by the configuration manager 406. The configuration manager 406 then sends the new switch configuration model to the switch controller 404. The switch controller 404 accesses the affected switching node 32b–32f by sending requests to the communications manager 208. The switch controller 404 executes the new switch configuration model on the affected switching node. If the new switch configuration model from the configuration database does not match the physical switching node 32b–32f, the switch controller 404 sends an alarm to the system administrator through the GUI 412.

Figure 5A:
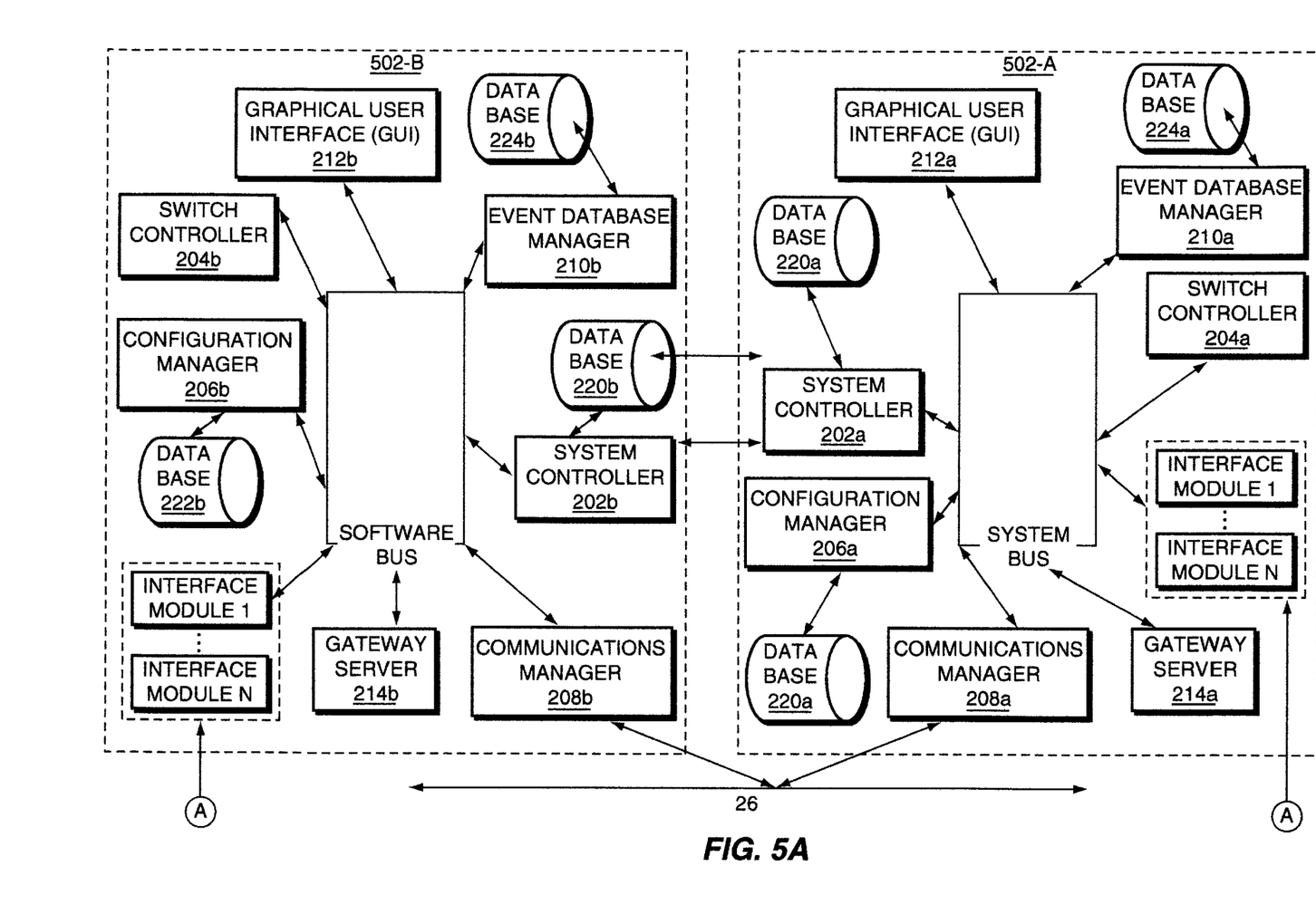
FIG. 5 illustrates the connection of duplicated administrative processes in order to provide redundancy.
Figure 5B:
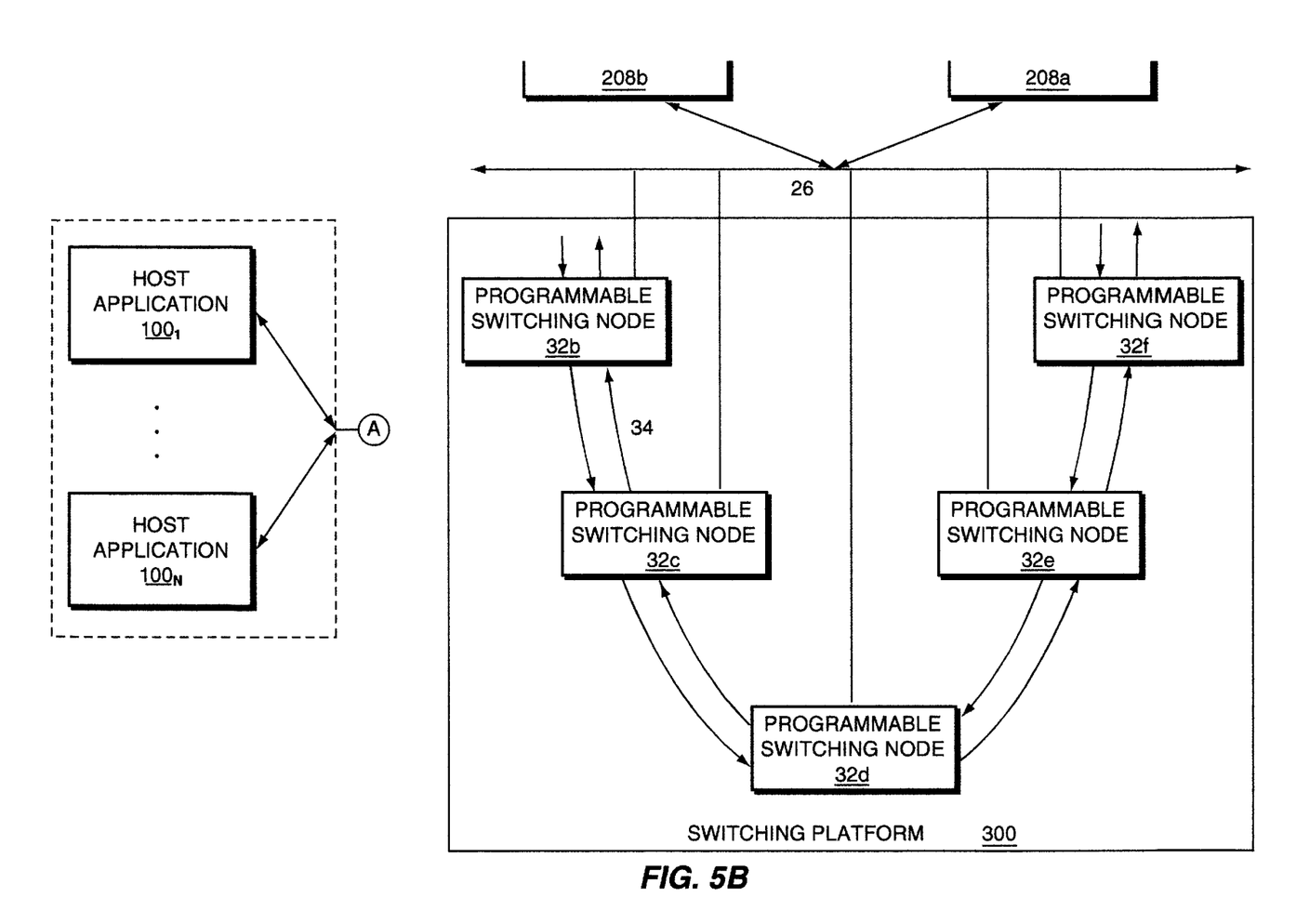

FIG. 5 depicts a preferred embodiment of the switching system in which the administrative processes 502A–502B are duplicated over multiple computers in order to provide redundancy. In this environment, only one set of the administrative processes 502A actively accesses the switching platform 300 at any given time. The other set of administrative processes 502B is idle and becomes active only when the active set of administrative processes 502A is disable.

The system controllers 202a and 202b in both sets of administrative processes 502A–502B communicate with each other in order for the system controller 202b in the idle set of administrative processes 502B to monitor the state of the active set of administrative processes 502B. As soon as the system controller 202a in the active set of administrative processes 502A alerts the system controller 202b in the idle set of administrative processes 502B that a process in the active set is disabled and cannot be restarted, the system controller 202b in the idle set of 502b initiates operation of the other administrative processes in the idle set 502b and the idle set of administrative processes 502b then becomes the active set of administrative processes. The previously active set of administrative processes 502a then becomes the idle set of administrative processes.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A communications network comprising:
 A) a plurality of switching nodes;
 B) an internal network interconnecting the switching nodes for conveying switched telecommunications data between them;
 C) at least one of a plurality of host computers that runs supervisory software applications requiring the performance of common administrative tasks;
 D) a host network linking said plurality of host computers with the switching nodes;
 E) administrative processes having common administrative applications residing on one of said host computers, each said common administrative application performing a specific administrative task relating to the switching nodes; and
 F) means for providing access to the administrative processes by the switching nodes and for identifying messages of various types and communicating said messages between the supervisory software applications and the common administrative applications, whereby each supervisory software application can invoke the operation of a selected common administrative application to perform common administrative tasks in one or more particular switching nodes.

2. The communications network defined in claim 1 wherein the common administrative applications include a gateway server which further comprises a registration table for storing registration information from the common and supervisory applications, the table containing an entry for each application, each entry comprising the types of messages that the application accepts and an address for the application where messages are sent.

3. The communications network defined in claim 2 wherein each common administrative application comprises a gateway agent for communications between the application and the gateway server, after an application generates a message, the associated gateway agent obtains a list of common and supervisory applications that accept the generated message with their addresses from the gateway server's registration table and routes the message to the receiving application.

4. The communications network defined in claim 1 wherein the common administrative applications comprise a system controller which further comprises (a) means for starting up the other common administrative applications during the communications network startup;

(b) means for monitoring the other common administrative applications for failure during the network operation; and (c) means for restarting them after a failure.

5. The communications network defined in claim 1 wherein the common administrative applications comprise an event manager for storing records of messages and alarms from other common applications and other system information, said event manager further comprising a programmable component for customization of alarms by the system administrator.

6. The communications network defined in claim 1 wherein the common administrative applications comprise a graphical user interface (GUI) which serves as an interface between a system administrator and the common administrative applications.

7. The communications network defined in claim 1 wherein the common administrative applications comprise a communications manager which connects the switching nodes to the other administrative and supervisory applications and which routes messages from the applications to the switching nodes.

8. The communications network defined in claim 1 wherein the common administrative applications comprise a configuration manager which maintains switch configurations in configuration databases on disks and alerts other common administrative applications to configuration updates.

9. The communications network defined in claim 8 wherein the common administrative applications comprise a switch controller which further comprises (a) means for receiving switch configuration information from the configuration manager application;

(b) means for mapping the configuration information to the appropriate switching node; and (c) means for notifying a system administrator of any configuration errors or updates.

10. The communications network defined in claim 9 wherein the switch controller further comprises independent sub-components for managing each physical and logical entity in the switching nodes, said components communicate with each other and the switch controller further comprises means for maintaining of a model of each switching node.

11. The communications network defined in claim 1 wherein the supervisory applications comprises an interface layer which further comprises interface modules, each interface module is associated with a supervisory application and is used as an interface between the supervisory application and the common administrative applications and switching nodes.

12. A method for performing common administrative tasks in communications network which comprises a plurality of switching nodes, an internal network interconnecting the switching nodes, at least one host computer that runs supervisory software applications requiring the performance of common administrative tasks, a host network linking each host computer with the switching nodes, common administrative applications on the host computers, each common application performing a specific administrative task relating to the switching nodes, said common applications including a gateway server which stores routing information in a registration table, said method comprising the steps of A) registering each common application and supervisory application with the gateway server upon starting up the system, said registration information indicates the types of messages the application handles and the address of the application;

B) generating a message during system operation in accordance with a common administrative or supervisory task by a common or supervisory application;

C) obtaining a list of applications that handle the type of message generated by the common or supervisory application from the gateway server's registration table; and D) routing the message to the address of each application obtained from the registration table.

13. The method for performing common administrative tasks in a communications network as defined in claim 12, including the further steps of:

(A) starting up the common administrative applications during the communications network start up;

(B) monitoring said common administrative applications for failure during the network operation; and (C) restarting common administrative applications after a failure has occurred.

14. The method for performing common administrative tasks in a communications network as defined in claim 13, including the further step of:

storing records of messages and alarms from other common administrative applications and other system information, and customizing alarms.

15. The method for performing common administrative tasks in a communications network as defined in claim 14, including the further step of:

providing a graphical user interface (GUI) which serves as an interface between a system administrator and the common administrative applications.

16. The method for performing common administrative tasks in a communications network as defined in claim 15, including the further step of:

routing messages from the applications to the switching nodes.

17. The method for performing common administrative tasks in a communications network as defined in claim 16, including the further step of:

maintaining switch configurations in configuration databases on disks and alerting other common administrative applications to configuration updates.

18. The method for performing common administrative tasks in a communications network as defined in claim 17, including the further steps of:

(A) receiving switch configuration information from a configuration manager application;

(B) mapping configuration information to an appropriate switching node; and (C) notifying the system administrator of any configuration errors or updates.

19. The method for performing common administrative tasks in a communications networks as defined in claim 18, including the further step of:

maintaining a model of each switching node.

* * * * *